United States Patent [19]

Kisanuki

[11] Patent Number: 4,756,944

[45] Date of Patent: Jul. 12, 1988

[54] DOOR GLASS WEATHER STRIP FOR AUTOMOBILES

[75] Inventor: Hisayuki Kisanuki, Ichinomiya, Japan

[73] Assignee: Toyoda Gosei Co., Ltd., Nishikasugai, Japan

[21] Appl. No.: 35,911

[22] Filed: Apr. 8, 1987

[30] Foreign Application Priority Data

Aug. 8, 1986 [JP] Japan .................. 61-187289

[51] Int. Cl.⁴ .............................................. E06B 7/16
[52] U.S. Cl. ........................................ 428/122; 49/490; 428/188; 428/358
[58] Field of Search ............... 428/122, 358, 188; 49/490

[56] References Cited

U.S. PATENT DOCUMENTS

| | | | |
|---|---|---|---|
| 3,706,628 | 12/1972 | Azzola | 428/122 |
| 4,306,380 | 12/1981 | Vettel | 428/358 X |
| 4,505,965 | 3/1985 | Zipperle | 428/122 |
| 4,584,793 | 4/1986 | Okada et al. | 49/495 X |
| 4,593,494 | 6/1986 | Ono et al. | 49/374 |
| 4,616,446 | 10/1986 | Okamoto | 49/441 |
| 4,643,923 | 2/1987 | Bernitz et al. | 428/122 X |

FOREIGN PATENT DOCUMENTS

0171821  2/1986  European Pat. Off. .......... 428/122

*Primary Examiner*—Henry F. Epstein
*Attorney, Agent, or Firm*—Cushman, Darby & Cushman

[57] ABSTRACT

A weather strip in which a glass-holding member and a bend lip are coupled respectively with the outer circumferential side and the inner circumferential side of an outside wall surface of a mounting base member, and the mounting base member is made of solid rubber and the bend lip is made of sponge rubber. A solid rubber portion continuing to the mounting base member is formed at least on inside of a base portion of the bend lip and the rotation fulcrum of the bend lip is shifted towards the free end and the modulus of the base portion of the bend lip increases. In this construction, even if the distance between the top end of the outside wall portion and the top end of the bend lip in the free state is shortened sufficiently not to spoil the fine appearance, when the glass is elevated for full closing, the top end of the outside wall portion of the glass-holding member is not grasped between the seal wall portion and the glass peripheral surface. Consequently, the door glass weather strip is not spoiled in the normal sealing state and a fine appearance may be achieved.

8 Claims, 3 Drawing Sheets

DOOR GLASS WEATHER STRIP FOR AUTOMOBILES

BACKGROUND OF THE INVENTION

The present invention relates to a door glass weather strip for automobiles, where a glass-holding member and a bend lip are coupled respectively with the outer circumferential side and the inner circumferential side of an outside wall surface of a mounting base member, and the weather strip is mainly installed on the roof side of a door sash.

From the viewpoints of improvement of the fine appearance at closing state of the door glass and reduction of the air resistance or the wind-cutting sound during high speed running or the like, door glass weather strips in recent years are required to be flush with the door outside surface (the door sash outside wall surface) wherever practicable. For example, a weather strip as shown in FIGS. 1-2 is on the market as that to meet the above requirement.

A mounting base member 1 is provided with engaging foot portions 2, 3 respectively engaged with both sides of a rail 22 of a door sash 21. A glass-holding member 6 and a bend lip 11 are coupled respectively with the outer circumferential side and the inner circumferential side of an outside wall surface of the mounting base member 1.

The glass-holding member 6 is composed of an outside wall portion 7 which is nearly flush with the sash outside wall surface 23 at the mounting state of the glass-holding member 6 to the door sash 21, i.e., when the engaging foot portions 2, 3 of the mounting base member 1 are engaged with the rail 22, a support wall portion 8 which connects and supports the outside wall portion 7 to the mounting base member 1, and a seal wall portion 9 disposed between base portion of the support wall portion 8 and top end portion of the outside wall portion 7, so that peripheral portion of the glass G is sealed and held.

The bend lip 11 performs actions to press and seal the inside surface of the glass G. the bend lip 11 is usually claviform for the purpose of preventing wrinkle generation at the outside skin and for the benefit of the seal property, and is made of sponge rubber for the benefit of the seal property.

In the weather strip, the seal wall portion 9 of the glass-holding member 6 and the bend lip 11 are usually made of sponge rubber, and other parts, i.e., the mounting base member 1 and the outside wall portion 7 and the support wall portion 8 of the glass holding member 6 are made of solid rubber. More specifically, rubber materials such as EPDM or CR, in both solid compounding and sponge compounding forms, are prepared, and the weather strip is molded by means of two-color extrusion or the like.

When the weather strip of above-mentioned construction is installed on an actual automobile and the glass G is elevated for the full closing, as shown in FIG. 2, the outside wall portion 7 of the glass-holding member 6 flexes towards inside and the top end 7a of the outside wall portion 7 is pinched between the seal wall portion 9 and the peripheral surface of the glass G, whereby the normal sealing state, i.e. the prescribed sealing function, shown by dash-and-dot line is not obtained and the fine appearance may be spoiled.

The reason is presumed in that since the bend lip is made of sponge rubber having a small modulus in comparison to solid rubber and hence a large elongation (if the bend lip 11 is claviform, the base portion is relatively narrowed and this tendency becomes more significant), the top end of the bend lip 11 may be grasped between the peripheral surface of the glass G and the seal wall portion 9 before the peripheral surface of the glass G abuts on the seal wall portion 9, and if the glass G is further elevated while in the grasped state, the seal wall portion 9 is bent inward and the outside wall portion 7 is pulled to flex towards inside. In order to eliminate this problem, the distance 1 between the top end 7a of the outside wall portion 7 of the glass holding member 6 and the top end of the bend lip 11 at free state may be enlarged. However, since the outside wall surface of the mounting base member 1 is exposed therethrough, this construction is not favorable from the viewpoint of fine appearance. The distance 1 is usually made to be 1-4 mm so that the mounting base member 1 scarcely is exposed therethrough.

SUMMARY OF THE INVENTION

A door glass weather strip for automobiles according to the invention is constituted in that a glass holding member and a bend lip are coupled respectively with the outer circumferential side and the inner circumferential side of an outside wall surface of a mounting base portion, the mounting base member is made of solid rubber and the bend lip is made of sponge rubber, solid rubber the portion continuing to the mounting base member is formed at least on the inside of a base portion of the bend lip, the rotation fulcrum of the bend lip is shifted towards the free end, and the modulus of the base portion of the bend lip is large. Consequently, even if the distance between the top end of the outside wall portion and the top end of the bend lip at free state is shortened sufficiently so as not to spoil the fine appearance, when the glass is elevated for full closing, the top end of the outside wall portion of the glass holding member is not pinched between the seal wall portion and the glass peripheral surface according to following action, whereby the normal seal state is maintained and the fine appearance is not spoiled.

Since height of the bend lip in its upright state is decreased due to shifting of the rotation fulcrum of the bend lip from the free end and moreover the relative elongation amount of the bend lip is decreased due to an increase of the modulus at the base portion of the bend lip, a result similar to shortening of the bend lip is produced. Consequently, even if the bend lip is pulled due to the rising of the glass, the top end of the bend lip is not grasped between the glass peripheral surface and the seal wall portion.

DESCRIPTION OF THE PREFERRED EMBODIMENTS

Figure 1:
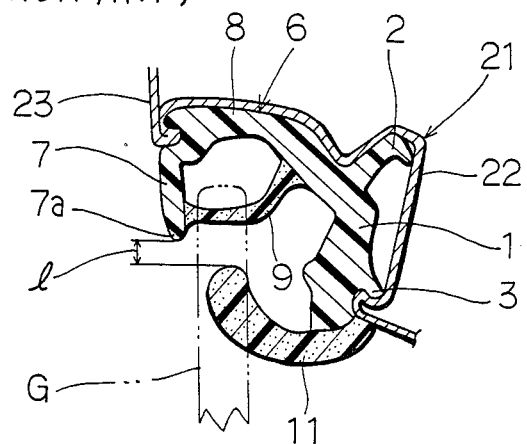
FIG. 1 is a sectional view of a weather strip in the prior art.
Figure 2:
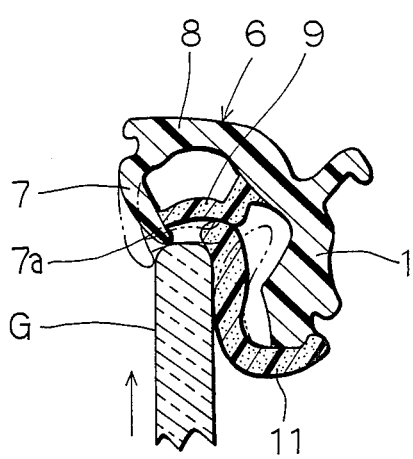
FIG. 2 is a sectional view illustrating action of FIG. 1.

Embodiments for clearer understanding of the invention will now be described. The same parts as those of the prior art are designated by the same reference numerals, and the part of the description which would be repetitive because it corresponds to that of the construction shown in FIGS. 1 and 2 shall be partially omitted.

Figure 3:
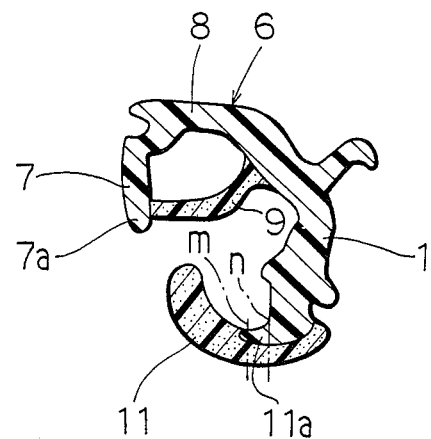
FIG. 3 is a sectional view of a weather strip as an embodiment of the invention.
Figure 4:
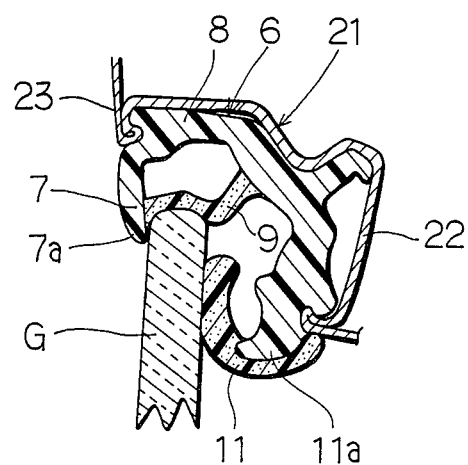
FIG. 4 is a sectional view illustrating installation made of FIG. 3.

FIGS. 3-4 show an embodiment of the invention wherein a solid rubber portion 11a continuing to a mounting base member 1 is formed on the inside of a base portion of a bend lip 11. The length of the solid rubber portion 11a depends on the elongability of the sponge rubber, the modulus of the solid rubber and the distance 1 between the top end 7a of the outside wall portion 7 and the top end of the bend lip 11 in the free state, but in the embodiment, the solid rubber portion 11a extends from the mounting base member 1 to a position slightly exceeding the curvature center position m of the base portion of the bend lip 11.

When the weather strip of the embodiment is installed on an actual automobile, i.e., when the weather strip is installed on the rail 2 of the door sash 21 through the engaging foot portion 2, 3, and the glass G is elevated for full closing, even if the distance 1 is shortened sufficiently so that the mounting base member 1, in contrast to the prior art, is scarcely exposed, the top end 7a of the outside wall portion 7 of the glass-holding member 6 is not grasped between the seal wall portion 9 and the peripheral surface of the glass G, whereby the normal seal state can be maintained and the fine appearance is not spoiled.

The reason is that since the solid rubber portion 11a continuing to the mounting base member 1 is formed on the inside of the base portion of the bend lip 11 and the rotation fulcrum of the bend lip 11 is shifted towards and free end (from the position n of the base portion to the curvature center position m in the embodiment), the bend lip 11 is rotated and the height in the upright state is decreased and the relative elongation amount of the bend lip 11 is decreased due to the increase of the modulus at the base portion of the bend lip, whereby a result similar to that which could be obtained by shortening of the bend lip is produced and even if the bend lip 11 is pulled due to the rising of the glass G the top end of the bend lip 11 will not be grasped between the peripheral surface of the glass G and the seal wall portion 9.

Figure 5:
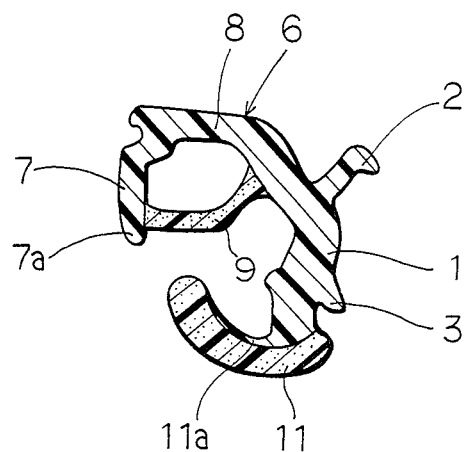
FIG. 5 is a sectional view of a weather strip as another embodiment of the invention.

FIG. 5 shows another embodiment of the invention where the solid rubber portion 11a is formed in a thin layer through nearly the whole length of the inside surface of the bend lip 11 and extends from the mounting base member 1.

In the weather strip of the embodiment, the rotation fulcrum of the bend lip 11 is shifted towards the free end in a manner similar to the foregoing embodiment, but the shift amount is small in comparison to the foregoing embodiment because the solid rubber portion 11a is made thin. On the other hand, the increase of the modulus spreads over not merely the base portion of the bend lip but over nearly the whole length. Consequently, the feature that the top end of the bend lip 11 does not abut on the seal wall portion 9 when the glass rises, has weight in the latter embodiment in comparison with the former embodiment.

Figure 6:
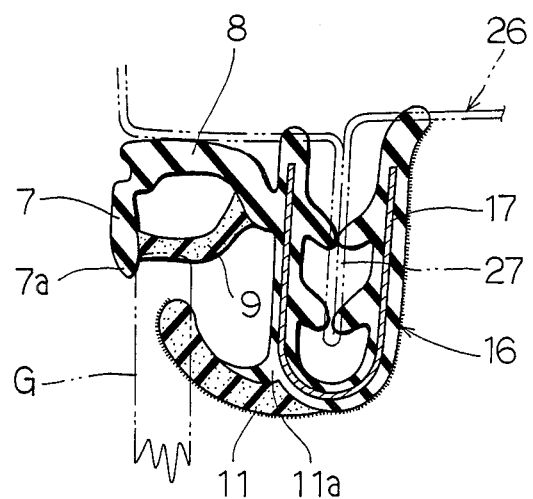
FIG. 6 is a sectional view of a weather strip as still another embodiment of the invention.

FIG. 6 shows a weather strip of still another embodiment of the invention, in which a mounting base member 16 is provided with an embedded insert 17 and provided so as to have a U-like cross-section to enable grasping of a flange portion 27 of a door sash 26. The outer surface of the bend lip 11 and the mounting base member 16 may be finished as shown in FIG. 6 for helping the seal property and providing a fine appearance.

What is claimed is:

1. A door glass weather strip for automobiles, comprising:
   (a) a mounting base member made of solid rubber and providing a mounting means for mounting the door glass weather strip to a door sash;
   (b) a glass-holding member of hollow form coupled with an outer circumferential side of an outside wall surface of said mounting base member for sealing and holding a peripheral portion of a door glass; and
   (c) a bend lip having a free end and a base, said bend lip being made of sponge rubber and being coupled at said base thereof with an inner circumferential side of said outside wall surface of said mounting base member on a base portion of said mounting base member for pressing against and sealing with an inside surface of said glass, said bend lip further having a solid rubber portion continuing to said mounting base member and formed on said inside of said base portion thereof, whereby the rotation fulcrum of said bend lip is shifted towards said free end of said bend lip and the modulus of the base portion of said bend lip increases as said door glass slides along said bend lip, in deflecting engagement therewith, towards engagement with said glass-holding member.

2. A door glass weather strip as set forth in claim 1, wherein:
   said bend lip has an outer surface and said mounting base member has a lower surface and said outer surface of the bend lip (11) and said lower surface of the mounting base member (1) are formed of sponge rubber integrally with one another as a continuous structure.

3. A door glass weather strip as set forth in claim 2, wherein:
   said mounting base member (1) is providwed with engaging foot portions (2, 3) for engaging on respective sides of a rail (22) of a door sash (21).

4. A door glass weather strip as set forth in claim 2, wherein:
   said solid rubber portion (11a) extends from said mounting base member (1) to a position slightly exceeding the curvature center position of the base portion of said bend lip (11).

5. A door glass weather strip as set forth in claim 2, wherein:
   said bend lip has an inside surface and said solid rubber portion (11a) spreads over the nearly whole length of the inside surface of said bend lip (11) and extends as a thin layer from the mounting base member (1).

6. A door glass weather strip as set forth in claim 1, wherein:
   said mounting base member (16) is provided with an embedded insert (17) of U-like cross-section to enable grasping of a flange portion (27) of a door sash (26) by said mounting base member.

7. A door glass weater strip as set forth in claim 6, wherein:

said solid rubber portion (11a) extends from said mounting base member (1) to a position slightly exceeding the curvature center position of the base portion of said bend lip (11).

8. A door glass weather strip as set forth in claim 6, wherein:

said bend lip has an inside surface and said solid rubber portion (11a) spreads over the nearly whole length of the inside surface of said bend lip (11) and extends as a thin layer from the mounting base member (1).

* * * * *